(12) United States Patent
Gonzalez et al.

(10) Patent No.: US 9,024,186 B1
(45) Date of Patent: May 5, 2015

(54) FLUSH MOUNT WALL PLATE ASSEMBLY

(71) Applicants: Brian Gonzalez, Miami, FL (US);
Jose-Raul Santiago, Miami, FL (US)

(72) Inventors: Brian Gonzalez, Miami, FL (US);
Jose-Raul Santiago, Miami, FL (US)

( * ) Notice: Subject to any disclaimer, the term of this patent is extended or adjusted under 35 U.S.C. 154(b) by 149 days.

(21) Appl. No.: 13/972,331

(22) Filed: Aug. 21, 2013

(51) Int. Cl.
*H02G 3/14* (2006.01)

(52) U.S. Cl.
CPC ........................................ *H02G 3/14* (2013.01)

(58) Field of Classification Search
USPC ................ 174/66, 67; 220/241, 242; 439/136
See application file for complete search history.

(56) References Cited

U.S. PATENT DOCUMENTS

| | | | | |
|---|---|---|---|---|
| 4,835,343 A * | 5/1989 | Graef et al. | ...................... | 174/66 |
| 5,456,373 A * | 10/1995 | Ford | .............................. | 220/242 |
| 6,768,055 B1 * | 7/2004 | Gorin | .............................. | 174/50 |

* cited by examiner

*Primary Examiner* — Dhirubhai R Patel
(74) *Attorney, Agent, or Firm* — Albert Bordas, P.A.

(57) ABSTRACT

A flush mount wall plate assembly, having an exterior plate and an interior plate. The interior plate is secured onto a junction box. The exterior plate is secured onto the interior plate, and a cover plate is secured onto the exterior plate. Drywall is positioned between the exterior plate and the interior plate. Joint compound is applied onto the exterior plate. When installed, the cover plate is approximately flush with adjacent drywall and top and bottom ramped edges, and first and second lateral ramped edges of the exterior plate when the interior plate is secured onto the junction box, the exterior plate is secured onto the interior plate, and the cover plate is secured onto the exterior plate.

17 Claims, 6 Drawing Sheets

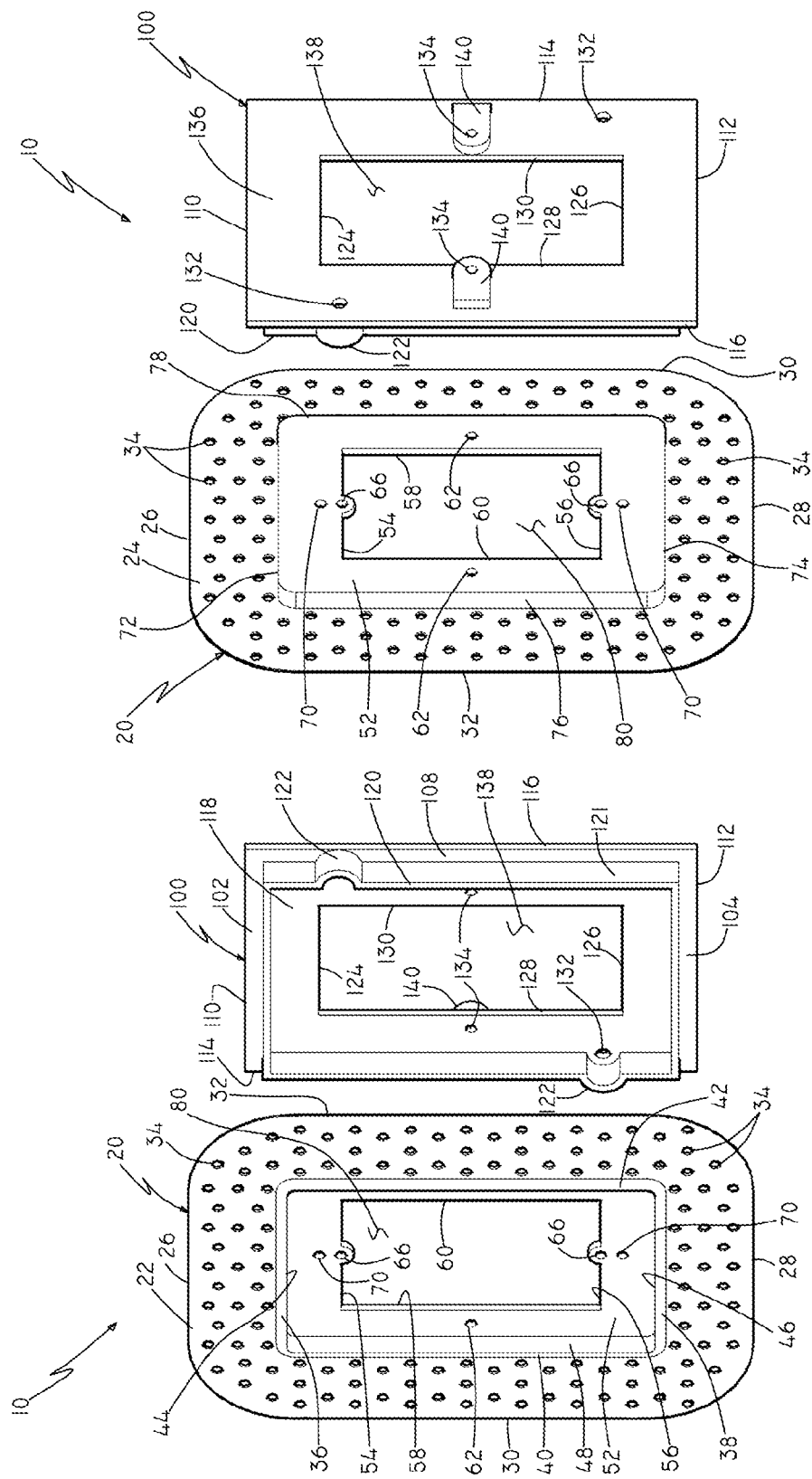

FLUSH MOUNT WALL PLATE ASSEMBLY

BACKGROUND OF THE INVENTION

1. Field of the Invention

The present invention relates to wall plates, and more specifically to wall plate assemblies that are flush mounted onto walls of a structure for electrical systems, and audio and visual components and systems.

2. Description of the Related Art

Several wall plates have been developed in the past. However, Applicants are not aware of any suggesting the novel features of the present invention.

SUMMARY OF THE INVENTION

The instant invention is a flush mount wall plate assembly, comprising an exterior plate and an interior plate. The interior plate is secured onto a junction box. The exterior plate is secured onto the interior plate, and a cover plate is secured onto the exterior plate. Drywall is positioned between the exterior plate and the interior plate. Joint compound is applied onto the exterior plate.

The exterior plate comprises front and rear faces, and a first cavity. The front face is tapered. The exterior plate comprises at least one hole extending from the front face to the rear face. The front face comprises top and bottom ramped edges, and first and second lateral ramped edges. Extending from the top and bottom ramped edges, and the first and second lateral ramped edges are top and bottom interior faces, and first and second lateral interior faces respectively. The top and bottom interior faces, and the first and second lateral interior faces extend to a base wall. The base wall comprises top and bottom base edges, and first and second lateral base edges. The cover plate is biased against the base wall when secured thereon. Protruding from the rear face are top and bottom exterior faces, and first and second lateral exterior faces. The top and bottom exterior faces, and the first and second lateral exterior faces extend to the base wall. The top and bottom base edges, and the first and second lateral base edges define the first cavity.

The interior plate comprises front and rear base faces, and a second cavity. Protruding from the front base face is an elevated perimeter edge. The drywall is positioned exteriorly to the elevated perimeter edge. The top and bottom exterior faces, and the first and second lateral exterior faces are positioned interiorly to the elevated perimeter edge. The rear face is approximately parallel to the base wall.

The cover plate is approximately flush with adjacent drywall and the top and bottom ramped edges, and the first and second lateral ramped edges when the interior plate is secured onto the junction box, the exterior plate is secured onto the interior plate, and the cover plate is secured onto the exterior plate.

It is therefore one of the main objects of the present invention to provide a flush mount wall plate assembly that mounts onto walls of a structure.

It is another object of this invention to provide a flush mount wall plate assembly that is flush mounted onto walls of a structure for electrical systems, and audio and visual components and systems.

It is another object of this invention to provide a flush mount wall plate assembly that when installed is approximately flush with adjacent drywall and the top and bottom ramped edges, and the first and second lateral ramped edges when the interior plate is secured onto the junction box, the exterior plate is secured onto the interior plate, and the cover plate is secured onto the exterior plate.

It is another object of this invention to provide a flush mount wall plate assembly that is of a durable and reliable construction.

It is yet another object of this invention to provide such an assembly that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a perspective front view of a flush mount wall plate assembly.

FIG. 2 represents a perspective rear view of the flush mount wall plate assembly.

DETAILED DESCRIPTION OF THE PREFERRED EMBODIMENT

Figure 3:
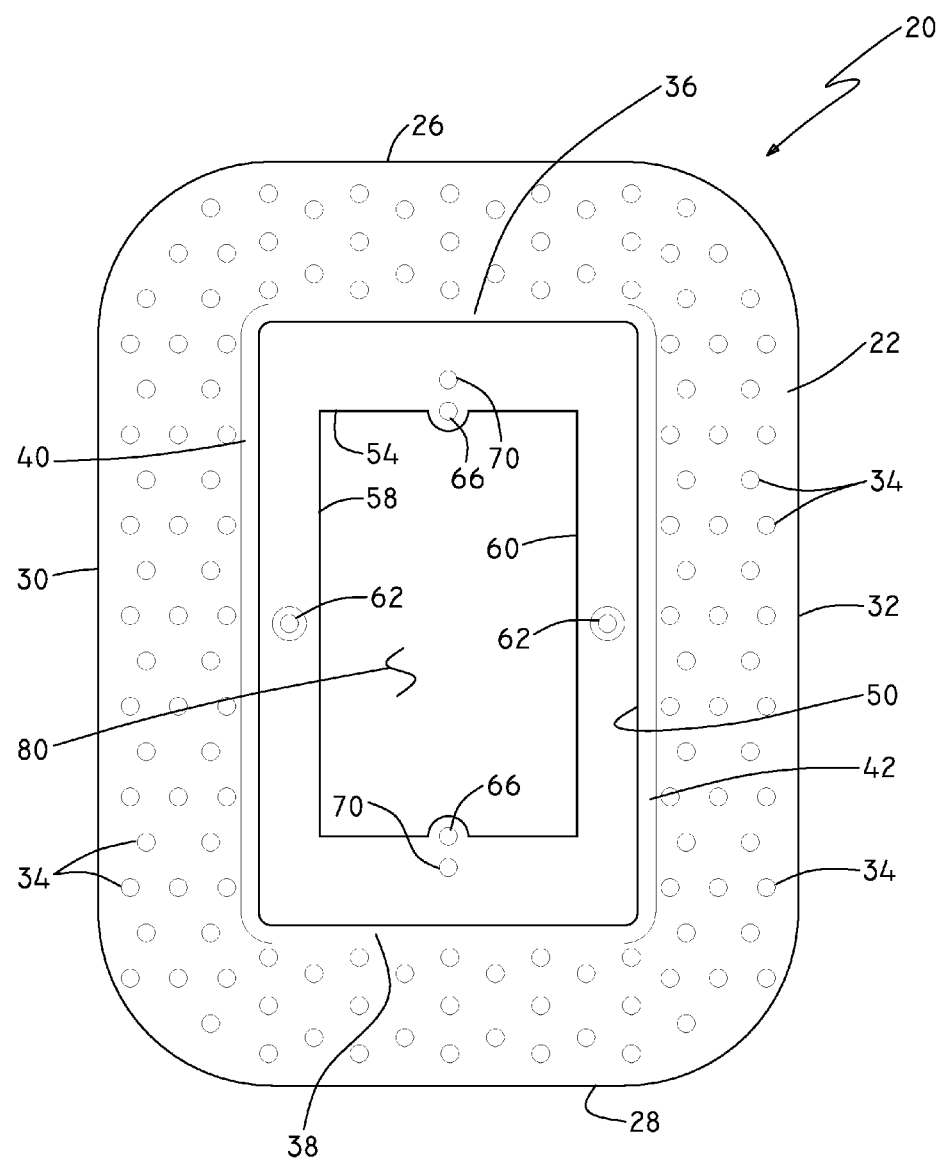
FIG. 3 represents a front view of an exterior plate.

Referring now to the drawings, the present invention is generally referred to with numeral 10. It can be observed that it basically includes exterior plate 20 and interior plate 100.

As seen in FIGS. 1 and 2, exterior plate 20 comprises front face 22 and rear face 24 with common top edge 26, bottom edge 28, and lateral edges 30 and 32.

Interior plate 100 comprises top base face 102, bottom base face 104, and lateral base faces 106 and 108. Interior plate 100 further comprises rear base face 136. Rear base face 136 and top and bottom base faces 102 and 104, and lateral base faces 106 and 108 have common top edge 110, bottom edge 112, and lateral edges 114 and 116. Extending perpendicularly from top, bottom, and lateral base faces 102, 104, 106 and 108 is elevated perimeter wall 121 having elevated perimeter edge 120, defining front base face 118. Elevated perimeter wall 121 protrudes from front base face 118 a predetermined distance. Front base face 118 and rear base face 136 have common top base edge 124, bottom base edge 126, and lateral base edges 128 and 130. Top and bottom base edges 124 and 126, and lateral base edges 128 and 130 define cavity 138.

As best seen in FIG. 1, front face 22 of exterior plate 20 comprises top ramped edge 36, bottom ramped edge 38, and lateral ramped edges 40 and 42. Extending from top ramped edge 36, bottom ramped edge 38, and lateral ramped edges 40 and 42 are top interior face 44, bottom interior face 46, and lateral interior faces 48 and 50, respectively. Top interior face 44, bottom interior face 46, and lateral interior faces 48 and 50 extend to base wall 52. Base wall 52 extends substantially perpendicular from top and bottom interior faces 44 and 46, and lateral interior faces 48 and 50. Top, bottom, and lateral faces 44, 46, 48 and 50 keep base wall 52 spaced apart from front face 22. In a preferred embodiment, base wall 52 is approximately parallel to front and rear faces 22 and 24. Base wall 52 comprises top base edge 54, bottom base edge 56, and lateral base edges 58 and 60. Top and bottom base edges 54 and 56, and lateral base edges 58 and 60 define cavity 80.

As best seen in FIG. 2, protruding from rear face 24 are top and bottom exterior faces 72 and 74, and lateral exterior faces 76 and 78. In a preferred embodiment, rear face 24 is flat and front face 22 is tapered. Top and bottom exterior faces 72 and 74, and lateral exterior faces 76 and 78 extend from rear face 24 to base wall 52.

Interior plate 100, further comprises stand-offs 140 transversally disposed at rear base face 136 preferably equidistant from top edge 110 and bottom edge 112.

As seen in FIG. 3, exterior plate 20 further comprises at least one adhesion hole 34 extending through front face 22 to rear face 24. Wall plate connecting holes 66 are defined adjacent to top and bottom base edges 54 and 56. A portion of top and bottom base edges 54 and 56 contour around wall plate connecting holes 66. Fastener holes 62 are cooperatively disposed at base wall 52 at a predetermined distance from lateral base edges 58 and 60. Relief holes 70 are also cooperative disposed at base wall 52 at a predetermined distance from top and bottom base edges 54 and 56.

Figure 4:
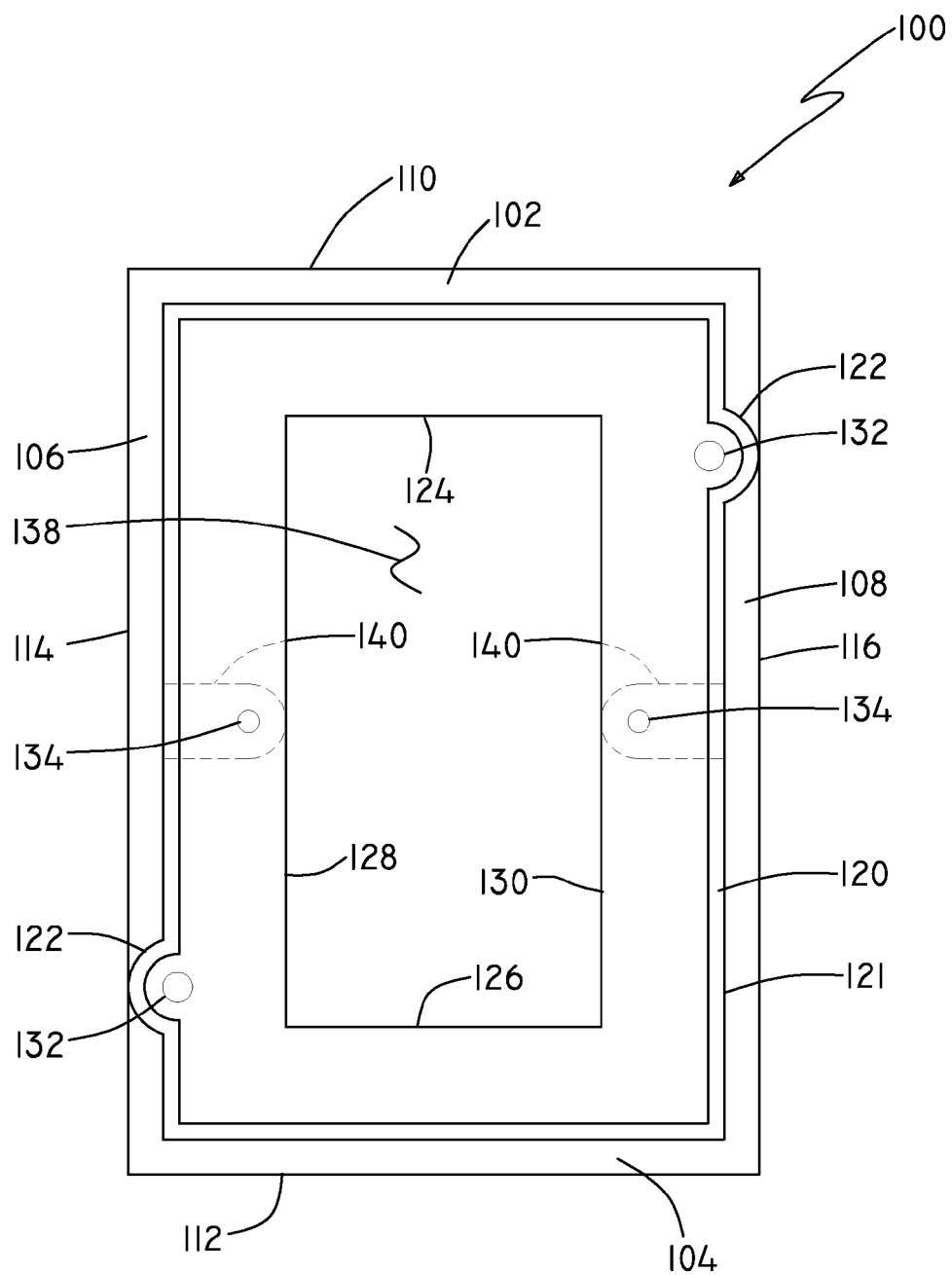
FIG. 4 represents a front view of an interior plate.

As seen in FIG. 4, elevated perimeter wall 121 has elevated perimeter edge fastener reliefs 122 extend toward lateral edges 114 and 116 without reaching lateral edges 114 and 116. Perimeter edge fastener reliefs 122 have respective junction box holes 132. Fastener holes 134 go through front base face 118 to stand-offs 140 at rear base face 136.

Figure 5:
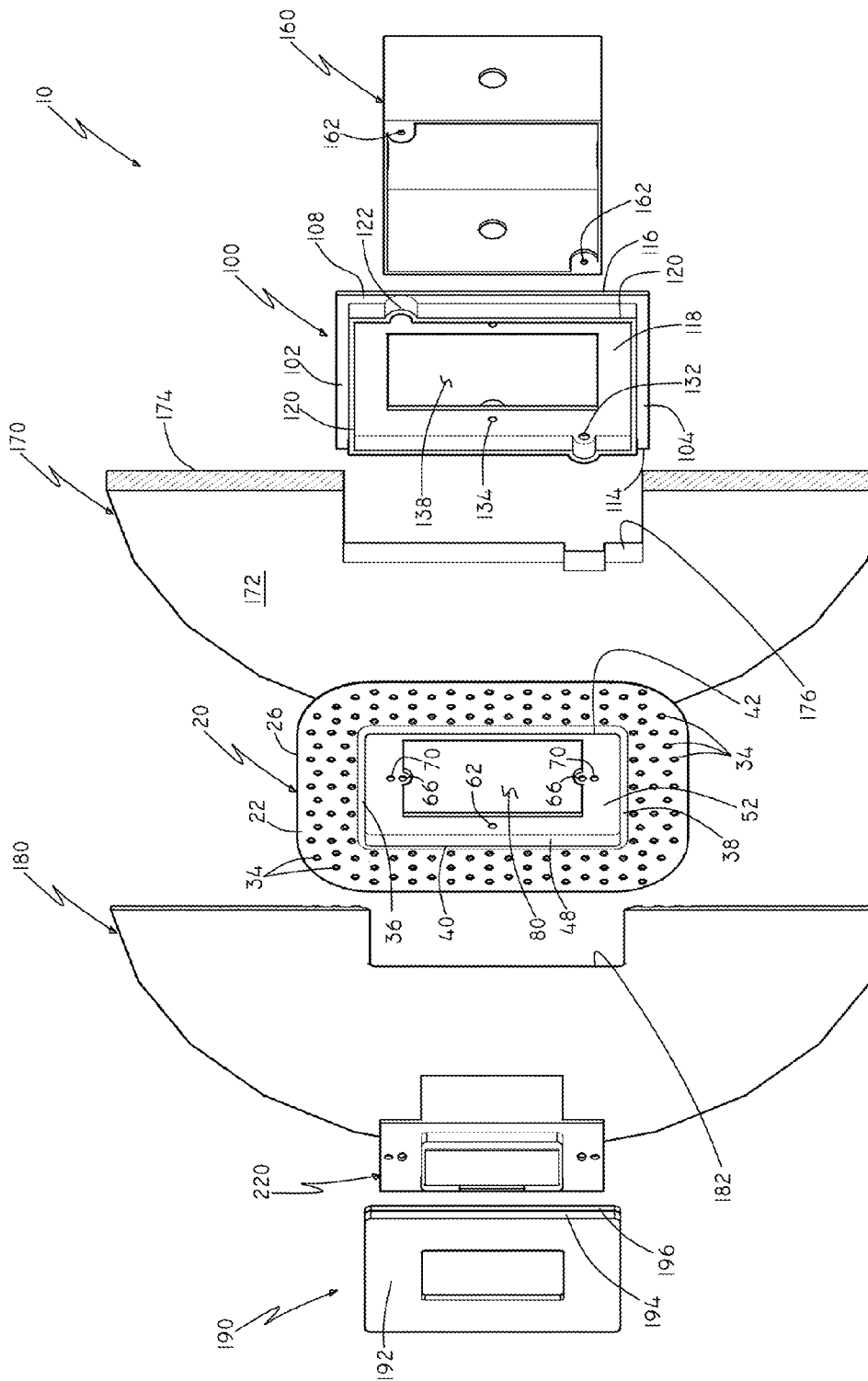
FIG. 5 represents an exploded view of the flush mount wall plate assembly presented with a wall of a structure and additional components.
Figure 6A:
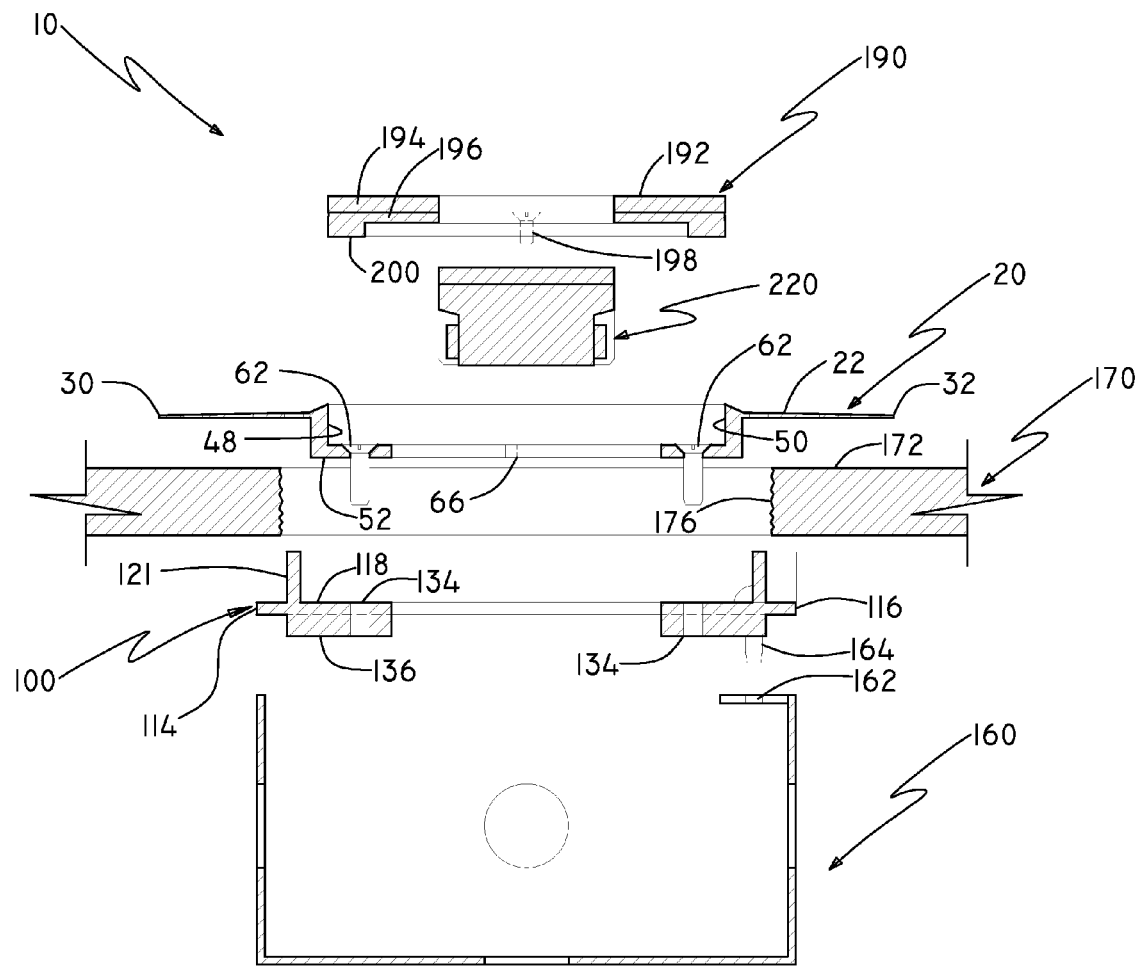
FIG. 6A represents an exploded top view of the flush mount wall plate assembly presented with a wall of a structure and additional components.
Figure 6B:
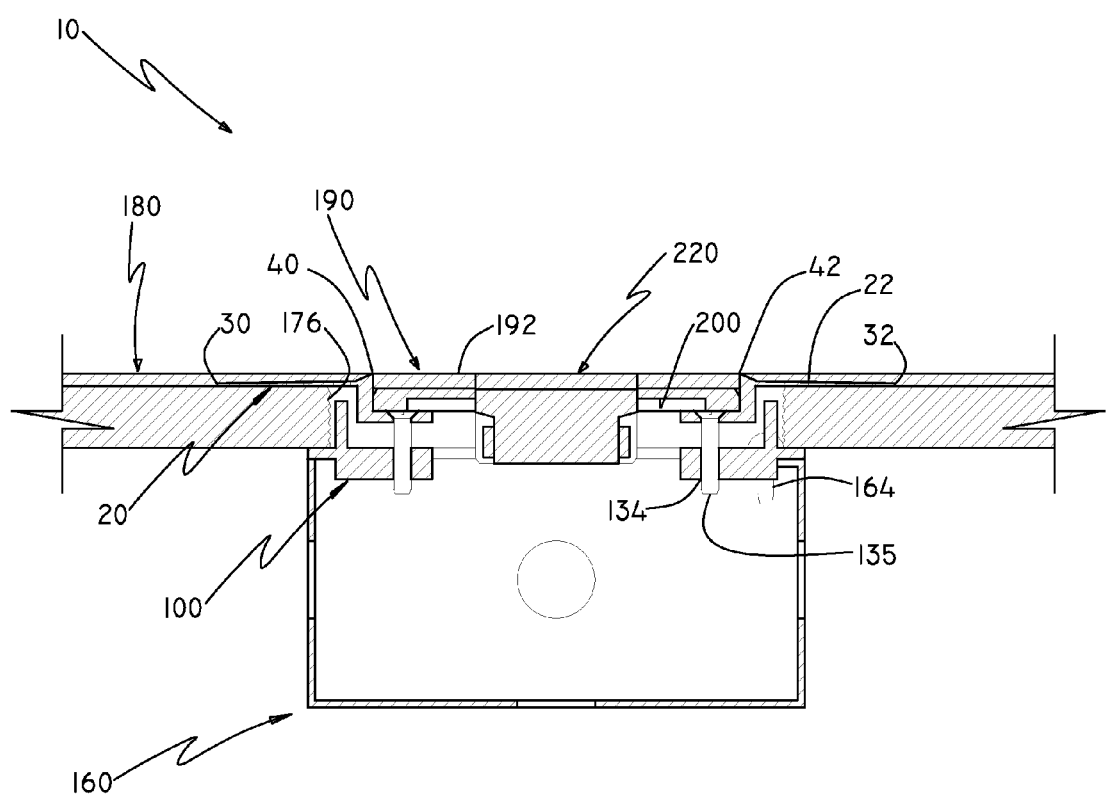
FIG. 6B represents a cut top view of the flush mount wall plate assembly assembled within the wall of the structure seen in FIG. 6A.

As seen in FIGS. 5 and 6B, interior plate 100 is secured onto junction box 160. Exterior plate 20 is secured onto interior plate 100, and cover plate 190 is secured onto exterior plate 20. Drywall 170 is positioned between exterior plate 20 and interior plate 100.

Positioned between exterior plate 20 and joint compound 180 is assembly 220, whereby assembly 220 is mounted onto exterior plate 20. Assembly 220 is any device installed with present invention 10. As an example, assembly 220 can be, but is not limited to being, a switch, an outlet, a cable and/or data jack or outlet, a telephone jack, a network jack, or a video and/or audio jack.

Joint compound 180 is applied onto exterior plate 20. Joint compound 180 has edges 182 defining a cavity. Adhesion holes 34 are intended to permit joint compound 180 to pass through to better secure it in place.

Top and bottom exterior faces 72 and 74, and lateral exterior faces 76 and 78 are positioned interiorly to elevated perimeter edge 120.

Drywall 170 is positioned exteriorly to elevated perimeter edge 120. Drywall 170 has exterior face 172, interior face 174 and cut out 176.

Cover plate 190 comprises exterior face 192, edges 194, edges 196, screw 198 and interior face 200.

Cover plate 190 is approximately flush with top, bottom, and lateral ramped edges 36, 38, and 40 and 42 when interior plate 100 is secured onto junction box 160. Exterior plate 20 is secured onto interior plate 100, and cover plate 190 is secured onto exterior plate 20, as best seen in FIGS. 5 and 6B.

As seen in FIGS. 6A and 6B, junction box 160 comprises fastener holes 162 and screw 164. Junction box 160 further comprises holes to permit cables go through.

As best seen in FIGS. 6A and 6B, front face 22 of exterior plate 20 is tapered.

Cover plate 190 is biased against base wall 52 when secured thereon. Cover plate 190 comprises exterior face 192 and interior face 200. Exterior face 192 has edges 194. Interior face 200 has edges 196. Screws 198 are mounted to interior face 200 and protrude outwardly. Screws 198 cooperatively mount into wall plate connecting holes 66 to secure cover plate 190 onto exterior plate 20. Cover plate 190 is secured onto exterior plate 20. Specifically, cover plate 190 is inserted within the cavity defined by top and bottom interior faces 44 and 46, and lateral interior faces 48 and 50. Drywall 170 is positioned between exterior plate 20 and interior plate 100.

As seen in FIGS. 5, 6A, and 6B, junction box holes 132 are cooperatively aligned with fastener holes 162. Interior plate 100 is secured onto junction box 160 with screws 164 passing through junction box holes 132 and fastener holes 162.

Also, fastener holes 62 are cooperatively aligned with fastener holes 134. Screws 135 pass through fastener holes 62 and 134 to secure exterior plate 20 to interior plate 100.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A flush mount wall plate assembly, comprising:
   A) an exterior plate comprising top and bottom interior faces and first and second lateral interior faces, and a plurality of holes, joint compound is applied onto said plurality of holes to better secure said exterior plate to an interior plate, a device is positioned between said exterior plate and said joint compound; and
   B) said interior plate is secured onto a junction box, said exterior plate is secured onto said interior plate, a cover plate is secured onto said exterior plate, whereby said cover plate is inserted within a first cavity defined by said top and bottom interior faces and said first and second lateral interior faces, and drywall is positioned between said exterior plate and said interior plate.

2. The flush mount wall plate assembly set forth in claim 1, further characterized in that said exterior plate further comprises front and rear faces.

3. The flush mount wall plate assembly set forth in claim 2, further characterized in that said front face is tapered.

4. The flush mount wall plate assembly set forth in claim 2, further characterized in that said front face comprises top and bottom ramped edges, and first and second lateral ramped edges.

5. The flush mount wall plate assembly set forth in claim 4, further characterized in that said top and bottom interior faces extend from said top and bottom ramped edges, and said first and second lateral interior faces extend from said first and second lateral ramped edges respectively.

6. The flush mount wall plate assembly set forth in claim 5, further characterized in that said top and bottom interior faces, and said first and second lateral interior faces extend to a base wall.

7. The flush mount wall plate assembly set forth in claim 6, further characterized in that said base wall comprises top and bottom base edges, and first and second lateral base edges.

8. The flush mount wall plate assembly set forth in claim 7, further characterized in that said cover plate is biased against said base wall when secured thereon.

9. The flush mount wall plate assembly set forth in claim 7, further characterized in that said top and bottom base edges, and said first and second lateral base edges define said first cavity.

10. The flush mount wall plate assembly set forth in claim 6, further characterized in that top and bottom exterior faces, and first and second lateral exterior faces, protrude from said rear face.

11. The flush mount wall plate assembly set forth in claim 10, further characterized in that said top and bottom exterior faces, and said first and second lateral exterior faces extend to said base wall.

12. The flush mount wall plate assembly set forth in claim 10, further characterized in that said interior plate comprises front and rear base faces, and a second cavity.

13. The flush mount wall plate assembly set forth in claim 12, further characterized in that an elevated perimeter wall having an elevated perimeter edge protrudes from said front base face.

14. The flush mount wall plate assembly set forth in claim 13, further characterized in that said drywall is positioned exteriorly to said elevated perimeter edge.

15. The flush mount wall plate assembly set forth in claim 13, further characterized in that said top and bottom exterior faces, and said first and second lateral exterior faces are positioned interiorly to said elevated perimeter edge.

16. The flush mount wall plate assembly set forth in claim 6, further characterized in that said rear face is approximately parallel to said base wall.

17. The flush mount wall plate assembly set forth in claim 4, further characterized in that said cover plate is approximately flush with said top and bottom ramped edges, and said first and second lateral ramped edges when said interior plate is secured onto said junction box, said exterior plate is secured onto said interior plate, and said cover plate is secured onto said exterior plate.

* * * * *